United States Patent
Wu

(10) Patent No.: US 6,612,598 B2
(45) Date of Patent: Sep. 2, 2003

(54) REAR STEERING DEVICE FOR A TRICYCLE FOR CHILDREN

(76) Inventor: Jung-Jyh Wu, Floor 7, No. 5, Lane 56, Jong Jeng 2nd Road, Ling Yea District, Kaohsiung (TW)

( * ) Notice: Subject to any disclaimer, the term of this patent is extended or adjusted under 35 U.S.C. 154(b) by 0 days.

(21) Appl. No.: 10/054,918

(22) Filed: Jan. 25, 2002

(65) Prior Publication Data

US 2003/0141693 A1 Jul. 31, 2003

(51) Int. Cl.$^7$ .............................. B62B 3/12; B62K 9/02
(52) U.S. Cl. ..................... 280/270; 280/282; 280/47.11
(58) Field of Search .................. 280/270, 282, 280/292, 263, 288.4, 304.5, 62, 293, 47.11, 774

(56) References Cited

U.S. PATENT DOCUMENTS

| | | | | |
|---|---|---|---|---|
| 94,056 A | * | 8/1869 | Allen | |
| 364,335 A | * | 6/1887 | Burdess | |
| 595,490 A | * | 12/1897 | Montgomery | |
| 638,112 A | * | 11/1899 | Graham | |
| 2,816,775 A | * | 12/1957 | Costello | |
| 3,237,961 A | * | 3/1966 | McMullen | |
| 3,485,507 A | * | 12/1969 | Christof | |
| 4,533,152 A | * | 8/1985 | Clark | 280/251 |
| 4,618,160 A | * | 10/1986 | McElfresh | 280/281 LP |
| D332,591 S | * | 1/1993 | Reely | D12/129 |
| 5,904,363 A | * | 5/1999 | Li | 280/282 |
| 5,924,713 A | * | 7/1999 | Li | 280/270 |
| 5,954,349 A | * | 9/1999 | Rutzel | 280/87.041 |
| 6,120,048 A | * | 9/2000 | Li | 280/270 |
| 6,302,421 B1 | * | 10/2001 | Lee | 280/210 |

* cited by examiner

*Primary Examiner*—Avraham Lerner
(74) *Attorney, Agent, or Firm*—Rosenberg, Klein & Lee

(57) ABSTRACT

A vehicle for children comprises a frame, a driving member rotatably mounted to a rear end of the frame, a rear steering rod, a driven member, and a belt. The frame comprises a head tube on a front end thereof. A handlebar stem extends through the head tube and is pivotable relative to the head tube. A handlebar is attached to an upper end of the handlebar stem to turn therewith. The rear steering rod includes a lower end attached to the driving member to turn therewith and an upper end for manual operation. The driven member is securely attached to the handlebar stem to turn therewith. The belt is mounted around the driving member and the driven member such that the driven member is turned when the driving member is turned as a result of turning of the rear steering bar.

3 Claims, 3 Drawing Sheets

REAR STEERING DEVICE FOR A TRICYCLE FOR CHILDREN

BACKGROUND OF THE INVENTION

1. Field of the Invention

The present invention relates to a rear steering device a tricycle for children.

2. Description of the Related Art

Children like to ride a tricycle that is steered by a handlebar. A rear steering device has been proposed to allow an adult to steer by a rear steering bar pivotally attached to the frame of the tricycle. The tricycle includes a handlebar stem having a vertical bevel gear and a transmission rod having a horizontal bevel gear on each of two ends thereof. One of the horizontal bevel gear meshes with the vertical bevel gear on the handlebar stem. The rear steering bar includes a vertical bevel gear meshed with the other horizontal bevel gear. Thus, an adult may pivot the rear steering bar to control the moving direction of the tricycle, thereby protecting the child on the tricycle. However, operation of the rear steering bar is difficult, as most part of force applied to the rear steering bar is consumed during transmission from the rear steering bar to the handlebar stem. Further, the bevel gears result in an increase in the cost, and the assembly procedure is complicated.

SUMMARY OF THE INVENTION

An object of the present invention is to provide a rear steering device for a tricycle for children that has a simplified structure and allows easy assembly without increasing the cost of manufacture.

A vehicle for children in accordance with the present invention comprises a frame, a driving member, a rear steering rod, a driven member, and a belt. The frame comprises a head tube on a front end thereof. A handlebar stem extends through the head tube and is pivotable relative to the head tube. A handlebar is securely attached to an upper end of the handlebar stem to turn therewith. A front fork is formed on a lower end of the handlebar stem. A front wheel is rotatably mounted to the front fork. A rear wheel unit is rotatably mounted to a rear end of the frame.

The driving member is rotatably mounted to the rear end of the frame. The rear steering rod includes a lower end attached to the driving member to turn therewith and an upper end for manual operation. The driven member is securely attached to the handlebar stem to turn therewith. The belt is mounted around the driving member and the driven member such that the driven member is turned when the driving member is turned as a result of turning of the rear steering bar.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
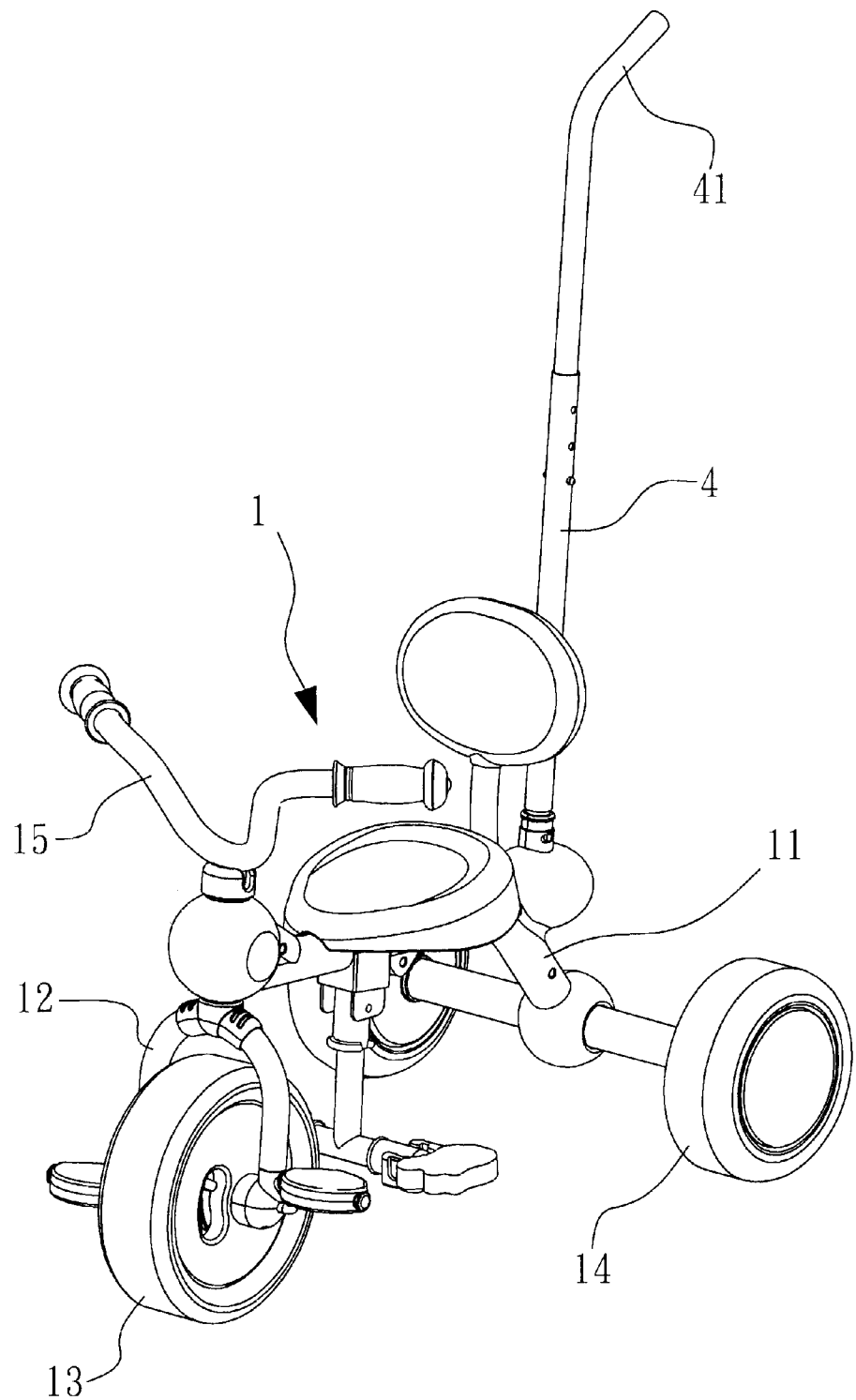
FIG. 1 is a perspective view of a tricycle for children with a rear steering device in accordance with the present invention.
Figure 2:
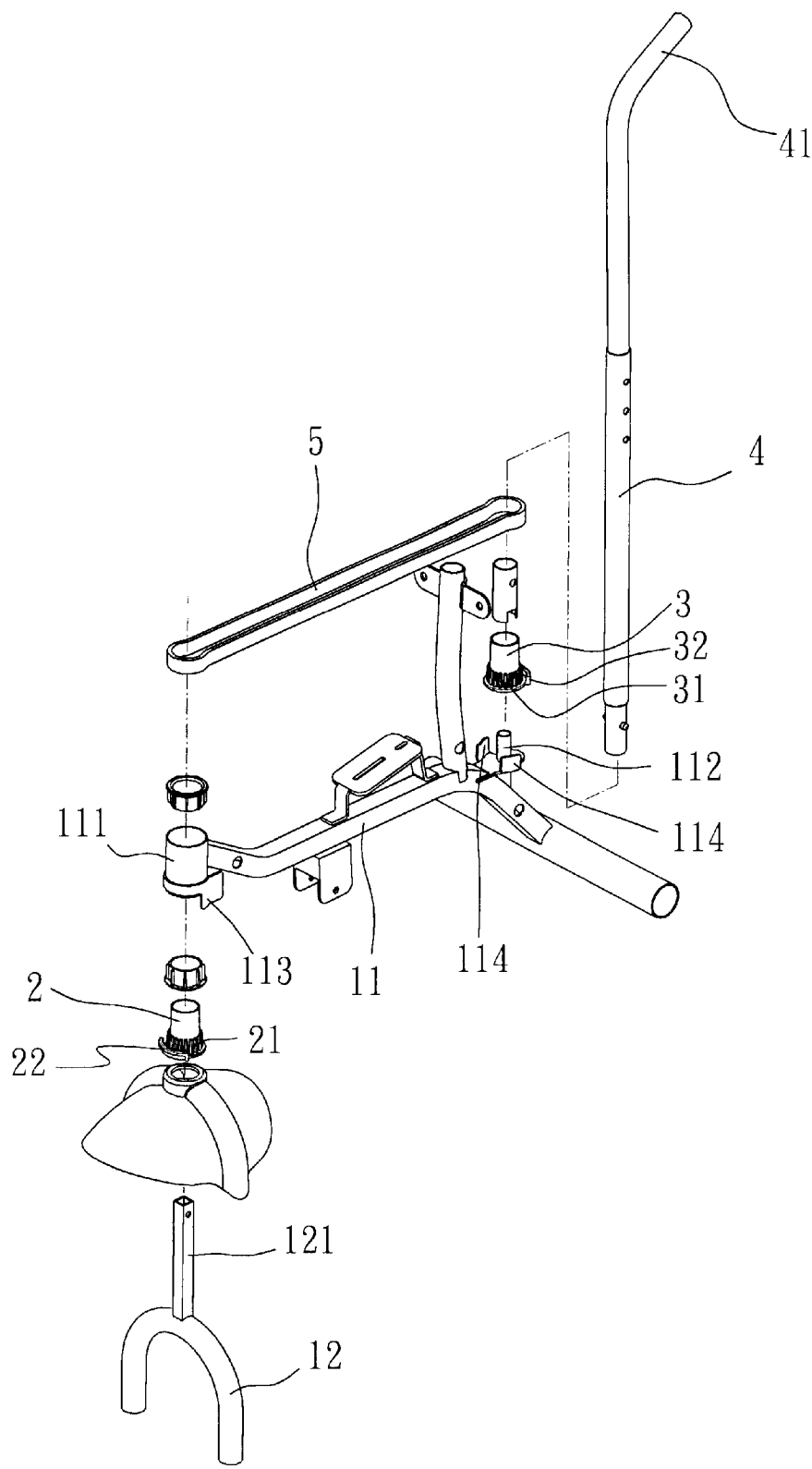
FIG. 2 is an exploded perspective view of the main portion of the tricycle in FIG. 1.

Referring to FIGS. 1 and 2, a tricycle 1 in accordance with the present invention generally comprises a frame 11 including a head tube 111 at a front end thereof and an axle 114 at a rear end thereof. A handlebar stem 121 is extended through the head tube 111 and pivotable relative to the head tube 111. A front fork 12 is formed on a lower end of the handlebar stem 121, and a front wheel 13 is rotatably mounted to the front fork 12. A handlebar 15 is attached to the upper end of the handlebar stem 121 to turn therewith, thereby controlling the moving direction of the tricycle. A rear wheel unit 14 is rotatably mounted to the rear end of the frame 11.

A rear steering device in accordance with the present invention comprises a driven member 2 that is securely mounted around the handlebar stem 121 to turn therewith. The driven member 2 includes a toothed section 21 and a stop 22. The rear steering device further includes a driving member 3 that is rotatably mounted to the axle 112 and that includes a toothed section 31 and a stop 32. The head tube 111 includes a stop plate 113, and the rear end of the frame 11 includes two spaced stop plates 114. A rear steering bar 4 includes a lower end securely attached to the driving member 3 to turn therewith and an upper end on which a grip 41 is provided. A belt 5 is mounted around the toothed section 21 of the driven member 2 and the toothed section 31 of the driving member 3.

Figure 3:
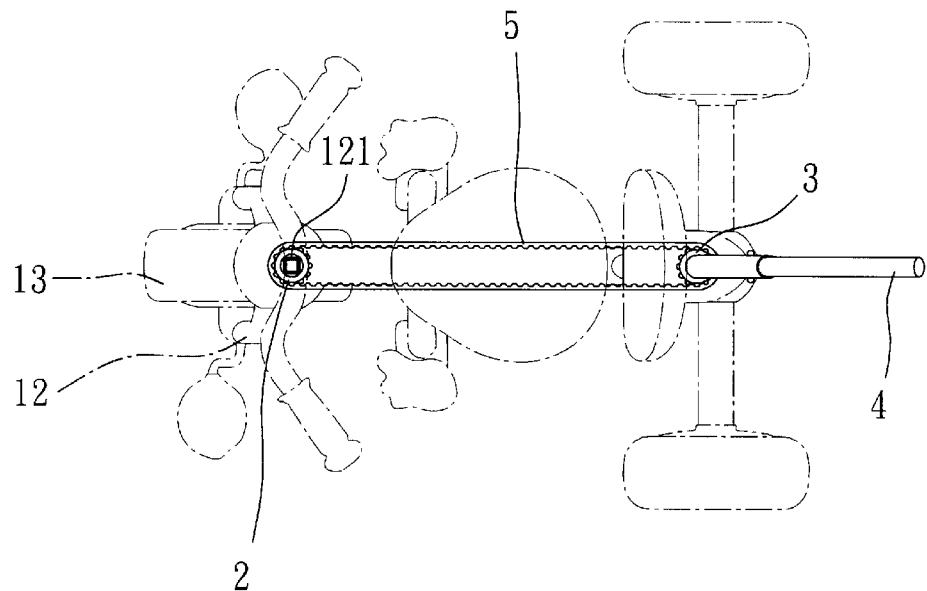
FIG. 3 is a schematic top view of the tricycle in accordance with the present invention.
Figure 4:
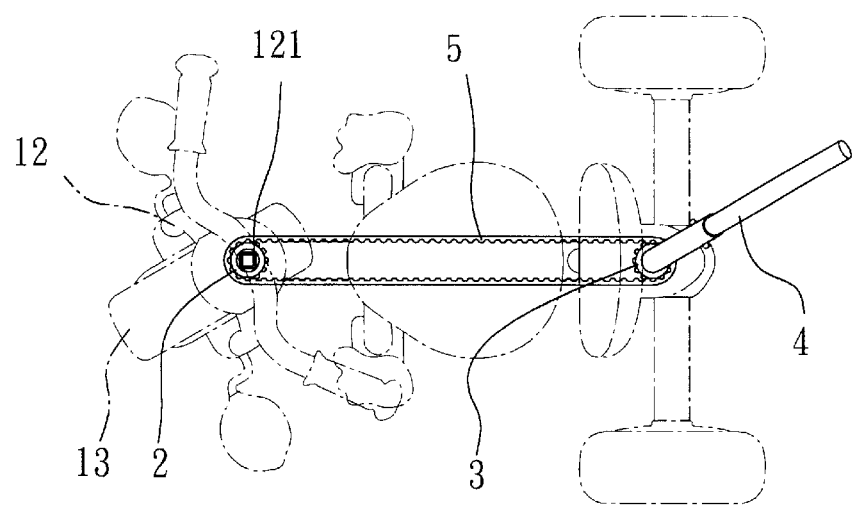
FIG. 4 is a view similar to FIG. 3, illustrating steering of the tricycle by a rear steering rod.

By such an arrangement, an adult standing behind the tricycle may grasp the grip 41 and turn the rear steering bar 4. The handlebar stem 121 is turned via transmission by the driving member 3, the belt 5, and the driven member 2, as shown in FIGS. 3 and 4. The stops 22 and 32 and the stop plates 113 and 114 may limit the rotational angle of the rear steering bar 4 and the handlebar 15, thereby preventing danger resulting from excessive turning of the handlebar stem 121 of the tricycle.

Although the invention has been described with reference to a tricycle, it is noted that the rear steering device in accordance with the present invention can be used with any other types of vehicles for children.

Although the invention has been explained in relation to its preferred embodiment, it is to be understood that many other possible modifications and variations can be made without departing from the scope of the invention as hereinafter claimed.

What is claimed is:

1. A vehicle for children comprising:
    a frame comprising a front end, a rear end, and an intermediate portion extending therebetween, a head tube being provided on the front end of the frame, a handlebar stem extending through the head tube and being pivotally displaceable relative to the head tube, the handlebar stem including an upper end and a lower end, a handlebar being securely attached to the upper end of the handlebar stem to turn therewith, a front fork being formed on the lower end of the handlebar stem, a front wheel being rotatably mounted to the front fork, a rear wheel unit being rotatably mounted to the rear end of the frame, a seat being disposed over said intermediate portion;
    a driving member rotatably mounted to the rear end of the frame;
    a rear steering rod coupled to the driving member for providing auxiliary steering control, the rear steering rod including a lower end attached to the driving member to turn therewith and an upper end for manipulation;

a driven member coaxially attached to the handlebar stem to turn therewith; and, a belt mounted around the driving member and the driven member whereby the driven member is turned responsive to the driving member being turned with the rear steering rod, said belt extending beneath the seat and along the intermediate portion of the frame.

2. The vehicle for children as claimed in claim 1, wherein the upper end of the rear steering rod includes a grip.

3. The vehicle for children as claimed in claim 1, wherein each of the driving and driven members includes a toothed section for meshed engagement of the belt.

* * * * *